United States Patent [19]

Morghen

[11] Patent Number: 4,500,079
[45] Date of Patent: Feb. 19, 1985

[54] REMOVABLE AND REPLACEABLE LOCATING PIN FOR LOCATING A WORKPIECE ON A SUB-PLATE FOR MACHINING

[75] Inventor: Manfred Morghen, San Diego, Calif.

[73] Assignee: General Dynamics Corporation/Convair Div., San Diego, Calif.

[21] Appl. No.: 575,234

[22] Filed: Jan. 30, 1984

[51] Int. Cl.³ .............................................. B23Q 3/10
[52] U.S. Cl. ..................................... 269/47; 269/309; 188/67
[58] Field of Search ................. 269/309, 310, 47, 48.1, 269/50, 52, 20; 403/257; 188/67, 31, 69, 60

[56] References Cited

U.S. PATENT DOCUMENTS

| | | | |
|---|---|---|---|
| 847,164 | 3/1907 | Corn | 188/67 |
| 2,051,965 | 8/1936 | Roth | 403/257 |
| 3,938,798 | 2/1976 | Solie et al. | 269/310 |
| 3,998,444 | 12/1976 | Stockwell | 269/20 |
| 4,174,828 | 11/1979 | Bergman | 269/20 |
| 4,291,416 | 9/1981 | Hoeptner | 188/67 |
| 4,429,862 | 2/1984 | Niedecker | 269/309 |

FOREIGN PATENT DOCUMENTS

| | | | |
|---|---|---|---|
| 988810 | 5/1951 | France | 188/67 |
| 1540210 | 10/1967 | France | 188/67 |

*Primary Examiner*—Robert C. Watson
*Attorney, Agent, or Firm*—John R. Duncan; Frank D. Gilliam

[57] ABSTRACT

A removable and replaceable locating pin adapted to locate a workpiece on a tooling fixture for machining thereof. The locating pin includes a locator pin having various illustrated configurations is adapted to cooperate with a workpiece for positioning the workpiece in various directions of restraint. The locating pin is provided with manually actuatable locking means that permits easy adjustment or removal of the specific locator pin as a particular machining operation may require. Flexibility of the set up of the tooling for machining of a workpiece is enhanced.

5 Claims, 6 Drawing Figures

REMOVABLE AND REPLACEABLE LOCATING PIN FOR LOCATING A WORKPIECE ON A SUB-PLATE FOR MACHINING

BACKGROUND OF THE INVENTION

This invention relates to an improvement in a locating pin intended to be used in cooperation with tooling in machining, and more particularly, but not by way of limitation, to a removable and replaceable locating pin adapted to locate a workpiece on a sub-plate for machining of the workpiece.

Numerous types of locating pins are known in the prior art as operable to support a part on a machine or position a workpiece on a tooling jig. These locating pins are often used with a gage plate for setting fixtures and the like, such plates conventionally comprising a base and an accurately formed top surface with a plurality of circumferentially spaced accurately formed and located openings therein. Obviously, such a gage plate is expensive and time consuming to manufacture because each opening must be very accurately located with relation to the other openings. In addition, any changes in temperature in use may cause the gage plate to lose its accuracy.

The prior art locating pins are often of "round" and "relieved" configuration. They are often used together, mounted on a fixture a distance apart corresponding to a distance between two apertures on a workpiece. When a workpiece is placed on the locator pins the round one provides restraint in all directions and the relieved locator is so designed to provide transverse restraint only.

One commonly used prior art relieved locator pin is commonly referred to as a diamond locator, because of its essentially diamond-shaped cross section. In use, however, known prior art locator pins are subject to a number of defects. One class of locator pins are elemental in construction and provide only the most rudimentary type of locator pin. Another type is constructed of many precision machined parts which then require exact assembly and adjustment to function as a locator pin.

Commonly, locator pins of the first type include only a bushing that is press fitted into a hole in a fixture or sub-plate. A locating pin is then inserted into the bushing or is pre-inserted into the bushing prior to it being press fitted into the fixture. Such locator pins while acceptable for some applications are non-adjustable and cannot be easily replaced or interchanged with other pins as the need should arise.

Examples of the latter type of locator pins previously discussed are shown in U.S. Pat. Nos. 2,497,679; 3,158,045; and 3,286,354. Characteristically, this type of locator pin provides for a central bore to be formed in the fixture or sub-plate. A plurality of eccentrically formed sleeves are then inserted within one another and rotated until a desired orientation has been achieved to provide the desired locator hole. The sleeves are then locked into position by one or more particularly configured bolts which bear against the outer periphery of one or more of the eccentric sleeves.

The present invention provides a simple, readily manufactured locator pin that may be easily inserted into a fixture and which has a locating portion that may be easily interchanged or replaced as the need should arise.

SUMMARY OF THE INVENTION

Briefly stated, the present invention contemplates a removable and replaceable locating pin adapted to locate a workpiece on a sub-plate for machining the workpiece which includes a receiver bushing adapted to be press fitted within a precisely located aperture in a sub-plate or fixture which receives a workpiece on its upper surface for machining thereof. The bushing is provided with a radially extending flange which is received by a counter sunk portion at one end of the aperture in the sub-plate for precise vertical positioning of the bushing. A locating means having a particularly configured head portion, such as a general diamond shape, is removably positioned within the receiver bushing, the head portion extending above the upper surface of the sub-plate to cooperate with the workpiece for positioning thereof.

An actuatable ball lock means cooperates with the locating means and the receiver bushing to precisely locate the locating means rotationally and vertically and to permit easy and quick manual removal of the locating means with a locating means having a differently configured head portion.

Various other advantages and features of the invention will become apparent to those skilled in the art from the following description, taken in conjunction with the accompanying drawings.

DETAILED DESCRIPTION OF THE DRAWING

Figure 1:
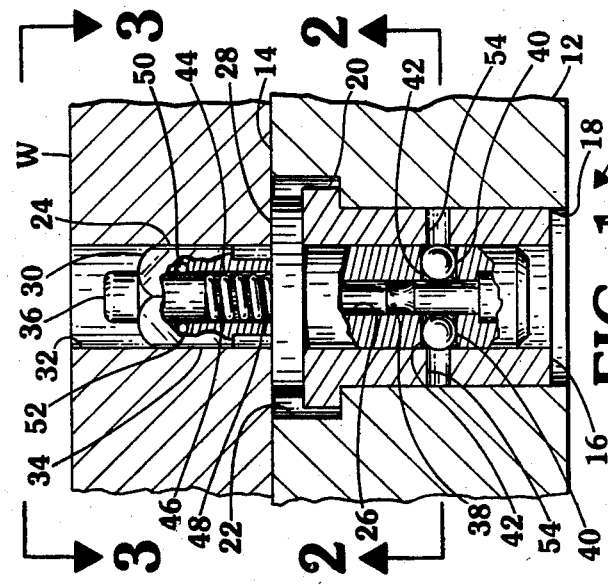
FIG. 1 is a fragmentary elevational view partially sectioned and illustrating one embodiment of a removable and replaceable locating pin constructed in accordance with the present invention and showing a workpiece being precisely positioned on a sub-plate for machining.

Referring now to the drawing in detail and in particular to FIG. 1, the reference character 10 generally designates a removable and replaceable locating pin adapted to locate precisely a workpiece W on a subplate or fixture 12 for machining of said workpiece W. The sub-plate or fixture 12 is one such as is generally known in the art for machining metal workpieces and is generally constructed of a metal such as aluminum or steel. The subplate 12 has an accurately finished upper surface 14 for receiving the workpiece for machining thereof.

The locating pin 10 includes a generally tubular receiver bushing 16 that is received in an aperture 18, preferably in the form of a precisely aligned bore having a predetermined bore, formed within the sub-plate 12 at a predetermined location. The receiver bushing 16 is preferably press fitted within the bore 18 by any known means and the bushing 16 is provided with a radially extending flange 20 at one end thereof which cooperates with a countersunk portion 22 of the bore 18 for vertically positioning the receiver bushing 16 within the bore 18.

A locating means is removably positioned within the receiver bushing 16. In the embodiment of the invention illustrated in FIG. 1, this locating means takes the form of a locating pin 24 having a central bore 26 for a purpose that will be described hereinafter. The locator pin 24 is provided with a radially extending flange 28 that cooperates with the upper portion of the receiver bushing 16 to vertically position the locator pin 24 which is preferably slip fitted within the receiver bushing 16.

The locator pin 24 is provided with a particularly configured head portion 30 which is particularly configured for predetermined contact with a bore 32 provided in the workpiece W for precise locating thereof on the sub-plate 12. In the embodiment of the invention shown in FIGS. 1-3 the head portion is shown as "relieved" and generally formed in a diamond shape having two facets thereof formed with rounded faces 34 which cooperate with the inner surface of the bore 32.

An actuatable ball lock means cooperates with the receiver bushing 16 and the locator pin 24 to precisely locate the locator pin 24 in a predetermined position for precision machining of the workpiece W and to permit selective removal of the locator pin 24 from the bushing 16 for replacement with another locating pin 24 having a differently configured head portion 30. In the embodiment of the invention shown in FIGS. 1-3, this ball lock means takes the form of longitudinally extending lock pin 36 that is preferably slip fitted within bore 26 within the locator pin 24. The lock pin 36 is provided with an annular relieved portion 38 which cooperates with a plurality of balls 40, loosely positioned in apertures 42 in the locator pin 24, that are normally urged into locking engagement with the receiver bushing 16 by being urged into apertures 54 formed in the bushing 16 by contact with the locking pin 24. The locking pin 36 is normally urged into locking position by a suitable spring 44 that cooperates with an inwardly extending shoulder 46 of the lock pin 36 and an inwardly extending shoulder 48 provided in the locator pin 24.

A suitable O-ring 50 may be disposed between the lock pin 36 and the locator pin 24 as in annular slot 52 in the locator pin 24 to preclude cutting fluid or metal chips used or generated during the machining operation from entering into the locating pin 10 between the lock pin 36 and the pin 24.

It will be understood that one use of the locating pin 10 would contemplate use of the locator pin 24 which has a generally diamond shaped configuration with at least two rounded facets 34 which contact the aperture 32 in the workpiece W for accurately locating thereof in at least one direction. When it is desired to remove and replace the locator pin 24 with a locator pin having a different configuration as will be common in numerically controlled machining operations or to rotate the locator pin 24 to a different radial position, the lock pin 36 is manually pushed downward to allow the balls 40 to be released from locking engagement with the receiver bushing 16 by allowing the balls 40 to enter the relieved portion of the lock pin 36, the upward pressure exerted by spring 44 being easily overcome. The locator pin 24 may then be rotated to a new position or, in the absence of a workpiece W, the locator pin 24 may be withdrawn and replaced with a locator pin 24 having a different configuration.

Figure 5:
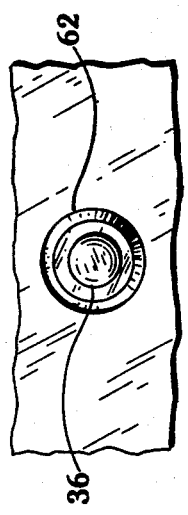
FIG. 5 is a fragmentary plan view partially broken away and particularly illustrating that the head portion of the locator pin shown in FIG. 4 has a cylindrical configuration, the rounded portion of which cooperates with a complementarily sized aperture in the workpiece.
Figure 4:
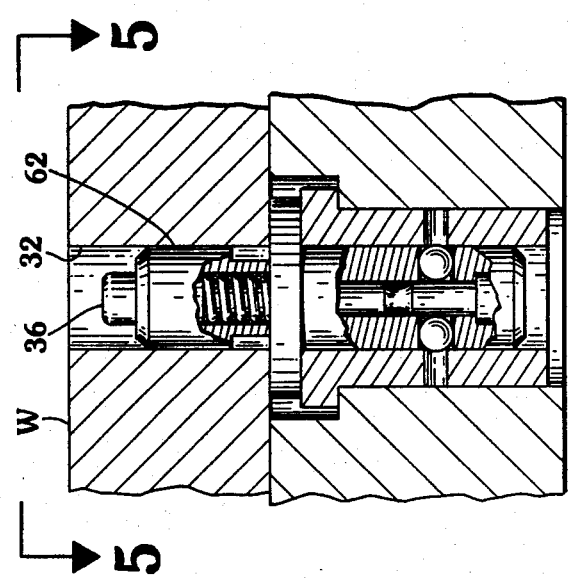
FIG. 4 is a fragmentary elevational view partially sectioned and illustrating another embodiment of the removable and replaceable locating pin and showing the locator pin thereof being provided with a head portion having a configuration that is different from that shown in FIG. 1.

Referring now to FIGS. 4 and 5, a locating pin 60 having a locator pin with a different configuration will be illustrated. As with the locating pin 10 of FIGS. 1-3 like numerals depict like elements in FIGS. 4 and 5. In the configuration of the locating pin 60 shown in FIGS. 4 and 5 is essentially identical to the locating pin 10 with the exception that the locator pin 62 is illustrated as being essentially cylindrical in form as opposed to the diamond shape of the locator pin 24 of the embodiment of the invention shown in FIG. 1. The locator pin 62 will be inserted into a complementarily size bore 32 in the workpiece W for accurately positioning of the workpiece on the upper surface of the sub-plate 12. The locating pin 60 permits quick and easy removal of the locating pin 60 by means of manually depressing the locking pin 36 to overcome the spring resistance of spring 44 and allow the locking balls 40 to enter the relieved portion 38 of the locking pin 36 and free the locating pin 60 for removal. A combination of locating pins 10 and 60 are advantageously used in the machining of workpieces W in a numerical controlled machining operation where the quick set up of tooling fixtures and workpieces is especially desirable.

Figure 6:
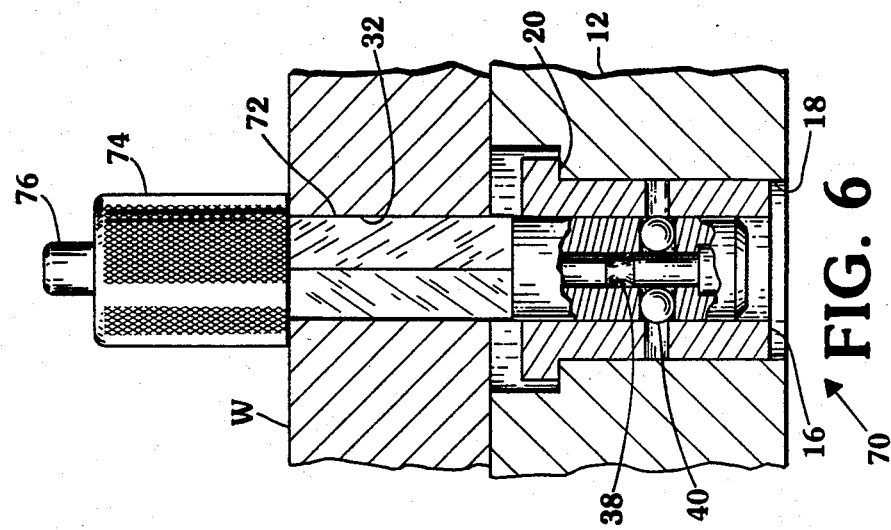
FIG. 6 is a fragmentary elevational view partially sectioned and illustrating yet another embodiment of the removable and replaceable locating pin and showing the locator pin being provided with a knurled head portion that extends above the upper surface of the workpiece for easy rotational adjustment of the locator pin within an aperture in the workpiece.
Figure 3:
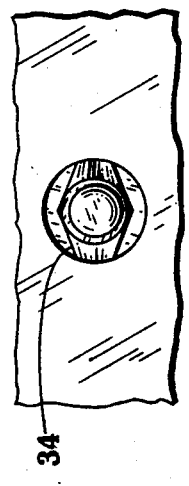
FIG. 3 is a fragmentary plan view illustrating the particularly configured head portion in contact with the workpiece for positioning thereof.
Figure 2:
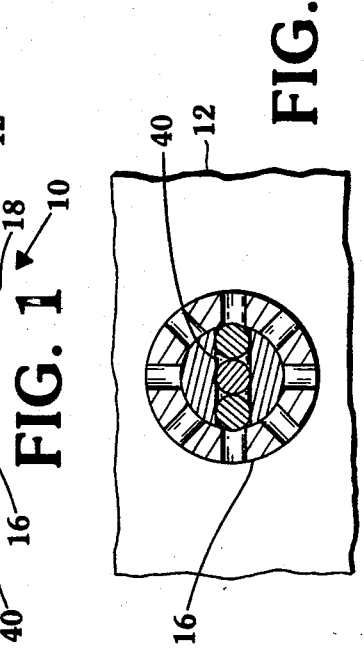
FIG. 2 is a fragmentary section taken along lines 2—2 in FIG. 1.

Referring now to FIG. 6, yet another embodiment of the locating pin of the present invention will be illustrated. Again as in FIGS. 1-3, and FIGS. 4-5, like reference characters will refer to like structural elements. In the embodiment of the locating pin shown in FIG. 6 the locating pin 70 is provided with a locator pin 72 which has an additional head portion 74 which extends above the upper surface of the workpiece W. This additional head portion may be knurled as shown in FIG. 6 or may otherwise be configured as having a T-shaped head to assist in adjustment or removal of the locator pin 72 from the receiver bushing 16. In FIG. 6, the locating pin is shown as having the new diamond shape as shown in FIGS. 1-3 but the invention is not so limited. As before manual depression of the locking pin permits easy adjustment or removal of the locator pin 72, which, for example, could be round, elliptical or diamond shaped as the particular machining application would require.

It can thus be seen that the present invention provides an easily removable and replaceable locating pin for locating a workpiece on a fixture and greatly facilitating the machining thereof.

While I have described my invention in connection with certain possible forms or embodiments thereof and have used, therefore, certain specific terms in connection with certain specific examples of my invention, it is to be understood that the present disclosure is illustrative rather restrictive and that locating pins having locator pins varying configurations may be resorted to without departing from the spirit or scope of the claims which follow.

I claim:

1. A removable and replaceable locating pin adapted to locate a workpiece on a sub-plate for machining of the workpiece comprising:

a receiver bushing adapted to be received within an aperture within a sub-plate at a pre-determined location, said bushing is provided with a radially extending flange at one end thereof which cooperates with the sub-plate for precisely vertically positioning the bushing within the aperture in the sub-plate;

a locating means removably positioned within the receiver bushing and extending above the upper surface of the sub-plate for cooperating with the workpiece positioned on the sub-plate, the head portion of the locator pin has a longitudinally extending generally diamond shaped configuration wherein at least one face thereof is rounded for intimate contact with the inner surface of the aperture in the workpiece; and actuatable ball lock means cooperating with the receiver bushing and the locator means to precisely locate the locating means in a pre-determined position for precision machining of the workpiece and to permit selective removal of the locating means for replacement with another locating means having a different configuration.

2. A removable and replaceable locating pin adapted to locate a workpiece on a sub-plate for machining of the work-piece comprising:

a receiver bushing adapted to be received within an aperture within a sub-plate at a pre-determined location, said receiver bushing is provided with a radially extending flange at one end thereof which cooperates with the sub-plate for precisely vertically positioning the bushing within the aperture in the sub-plate;

a locating means removably positioned within the receiver bushing and extending above the upper surface of the sub-plate for cooperation with the workpiece positioned on the sub-plate; and actuatable ball lock means cooperating with the receiver bushing and the locator means to precisely locate the locating means in a pre-determined position for precision machining of the workpiece and to permit selective removal of the locating means for replacement with another locating means having a different configuration, the ball means includes at least one ball which is releasably urged by the locating pin into locking engagement with a complementarily sized aperture located in the receiver bushing.

3. The locating pin of claim 2 wherein the ball lock means includes a plurality of balls which are releasably urged by the locating pin into a plurality of apertures arranged around the interior of the receiver bushing in predetermined radial locations for positioning the locator pin in a predetermined rotational position.

4. A removable and replaceable locating pin adapted to locate a workpiece on a sub-plate for machining of the workpiece comprising:

a receiver bushing adapted to be received within an aperture within a sub-plate at a predetermined location, said receiver bushing is provided with a radially extending flange at one end thereof which cooperates with the sub-plate for precisely vertically positioning the bushing within the aperture in the sub-plate;

a locating means removably positioned within the receiver bushing and extending above the upper surface of the sub-plate for cooperation with the workpiece positioned on the sub-plate;

actuatable ball lock means cooperating with the receiver bushing and the locator means to precisely locate the locating means in a pre-determined position for precision machining of the workpiece and to permit selective removal of the locating means for replacement with another locating means having a different configuration; and the locator pin is spring loaded by spring means within the receiver bushing to urge the ball into a locking position, the spring means adapted to being easily overcome by manual pressure for releasing the ball from locking engagement with the receiver bushing and permitting rotation of the locator pin within the receiver bushing or removal therefrom.

5. A removable and replaceable locating pin adapted to locate a workpiece on a sub-plate for machining of the workpiece comprising:

a receiver bushing adapted to be received within an aperture within a sub-plate at a pre-determined location, said receiver bushing is provided with a radially extending flange at one end thereof which cooperates with the sub-plate for precisely vertically positioning the bushing within the aperture in the sub-plate;

a locating means removably positioned within the receiver bushing and extending above the upper surface of the sub-plate for cooperation with the workpiece positioned on the sub-plate; and actuatable ball lock means cooperating with the receiver bushing and the locator means to precisely locate the locating means in a pre-determined position for precision machining of the workpiece and to permit selective removal of the locating means for replacement with another locating means having a different configuration;

the head portion of the locator pin is provided with a longitudinally extending elliptically formed head portion.

* * * * *